March 23, 1965 W. A. GIETEMA 3,175,223
PREFOCUSSING LEADER FILM FOR MOTION PICTURE PROJECTION
Filed Feb. 23, 1961

INVENTOR.
WILLIAM A. GIETEMA
BY
Kendrick, Schramm & Stolzy
ATTORNEYS.

United States Patent Office 3,175,223
Patented Mar. 23, 1965

3,175,223
PREFOCUSSING LEADER FILM FOR MOTION
PICTURE PROJECTION
William A. Gietema, Lancaster, Calif., assignor of onehalf to Ralph E. Steblay, San Bernardino, Calif.
Filed Feb. 23, 1961, Ser. No. 91,192
2 Claims. (Cl. 352—235)

This invention relates to motion picture projection and concerns particularly arrangements for prefocussing the projector.

An object of the invention is to avoid the loss of any exposed footage of the motion picture film to the viewer owing to the projector being out of focus.

An object of the invention is to provide means by which an amateur can accurately focus his projector during the time that the leader of a reel of motion picture film passes therethrough.

A more specific object of the invention is to enable the entire exposed footage to be projected in focus from the beginning thereof.

A further object of the invention is to provide improved leader film for prethreading a motion picture projector. A specific object is to provide leader film which may be employed for prefocussing the projector.

Still another object of the invention is to provide focussing indicia which stand out clearly when the film is in focus and merge or disappear or change color when the film is out of focus.

Other and further objects, features and advantages of the invention will become apparent as the description proceeds.

In carrying out the invention in accordance with a preferred form thereof, a leader film is attached to a motion picture film either before or after the film is developed. The leader film carries prefocussing indicia instead of emulsion to be exposed. In consequence, after the picture portion of the film has been exposed a reel of film results, the initial portion of which constitutes leader film with focussing indicia thereon, whereby the film may be brought exactly to focus before the exposed footage is projected and none of the exposed footage is thereby lost to the viewer. This is advantageous particularly for amateur photographers using 8 mm. and 16 mm. film.

In a preferred embodiment of the invention, longitudinal, parallel lines are printed on the leader film so closely spaced that they stand out clearly as distinct lines when the film is in focus, but merge when the film is out of focus. The lines may be of different colors so that a merged line of a different color, or colorless, results when the film is out of focus, but two distinct differently colored lines are projected when the film is in focus.

A better understanding of the invention will be afforded by the following detailed description considered in conjunction with the accompanying drawing in which.

Like reference characters are utilized throughout the drawing to designate like parts.

Figure 1:
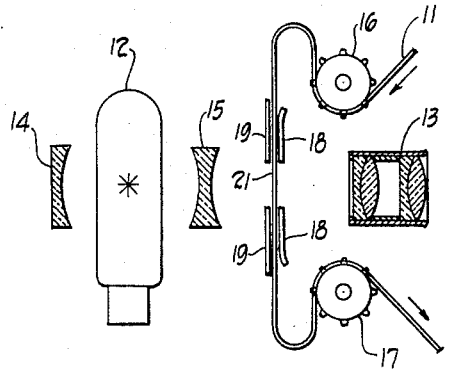
FIG. 1 is a schematic diagram of a motion picture projection system employing prefocussing leader film in accordance with the invention.

For projecting images from a film 11 upon a screen (not shown) a light source, such as an incandescent lamp 12 and an objective lens 13 are employed. Preferably as in conventional motion picture projection apparatus, a reflector 14 and a condensing lens 15 are also provided. Conventional means for advancing and shuttling the film 11 are provided which are represented schematically only sprocket wheels 16 and 17 and there is conventional film guide means, including front members 18 and back members 19. Although the invention is not limited to amateur use, the film is shown as 8 mm. films for amateur photographers, for whom the invention is especially adapted. As in a conventional motion picture projection apparatus, a portion of the film or a frame 21 is exposed to the light from the lamp 12. The light passes therethrough and through the objective lens 13, which is adjusted in position or by relative movement of its elements in order to bring the light rays passing through the frame portion 21 of the film 11 into focus at the point such as a screen (not shown) where it is desired to produce the image or picture.

Figure 2:
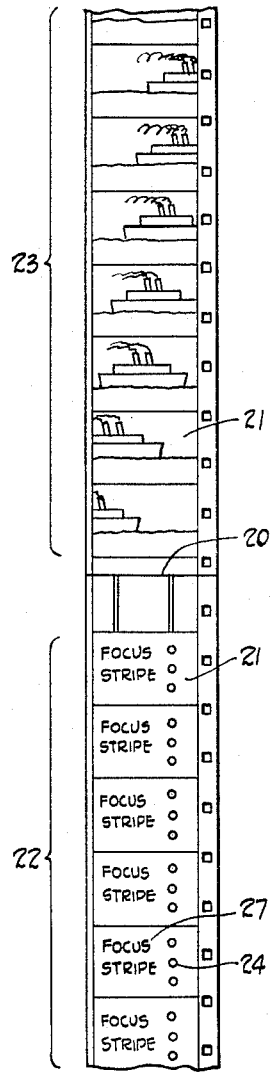
FIG. 2 is an illustration of a strip of film showing the leader film portion and the picture film portion in accordance with an embodiment of the invention.

In accordance with the invention, the film 11 is formed with two portions, a leader strip or film portion 22 and a picture portion 23, as indicated in FIG. 2, preferably spliced together as indicated by the splice line 20. In order that the images appearing in the picture portion 23 will be in focus from the very start of the picture, focussing indicia such as a line 24 is formed in the leader film portion 22. The prefocussing line 24 may consist of a longitudinal line of perforations as shown in FIG. 2, within successive frame portions 22 of the film, so that they will be exposed to light from the lamp 12 and images will be projected when the objective lens 13 is properly adjusted to bring the film in focus. The film is necessarily denser than the openings where the perforations 24 appear. Accordingly, when the film is in focus, the line of perforations 24 will appear as a vertical line of light spots upon the screen which blur or tend to disappear when the film is out of focus.

Figure 3:
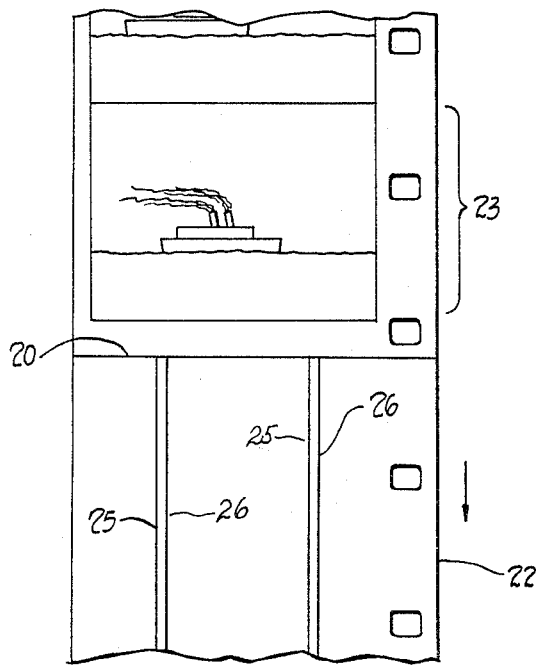
FIG. 3 is a fragmentary view, but to an enlarged scale, corresponding to FIG. 2 of another embodiment of the invention employing parallel line focussing indicia in the leader film portion with the lines of different colors.

The invention is not limited to the use of a line of perforations and if desired, one or two longitudinal lines 25 and 26 may be employed instead of the perforations 24 as shown in FIG. 3. Other indicia such as printed numerals or letters, for example, the words "focus stripe" 27 as indicated in FIG. 2 may also be employed in place of printed lines or perforations or supplementing the same.

When parallel lines are employed, they are preferably relatively closely spaced in pairs toward each side of the screen so that when the film is in focus, two distinct lines appear sharply projected for each pair of lines whereas when the film is out of focus they become blurred. Each line has a width sufficient to make it visible but the lines are not so close as to make the division therebetween imperceptible to the viewer of these lines when projected on a motion picture screen.

As a further aid in distinguishing the condition of sharp focus from lack of focus, the lines 25 and 26 may be of different colors, for example, yellow and blue. In consequence, when the film is in focus two distinct lines of different brilliant colors appear, such as yellow and blue lines, but when the film is out of focus, the two lines merge to produce a resultant color, in this case green or a single green line upon the screen.

Alternatively, the two different colors employed may be complementary, such as crimson and green. These appear as two distinct different colored lines when the film is in focus, but merge to produce a colorless line when the film is out of focus. Such a colorless line appears darker gray if the background density of the leader film portion is low or appears as a lighter gray or white line if the background density of the leader film is high. When the leader film portion of the film has a relatively high density except for the focussing indicia, the projectionist avoids subjecting the viewers to the glare of a relatively blank screen while the projector is being focussed and prior to the appearance of the motion picture from the picture portion 23 of the film.

Certain embodiments of the invention and certain methods of operation embraced therein have been shown and particularly described for the purposes of explaining the principle of operation of the invention and showing its application, but it will be obvious to those skilled in the art that many modifications and variations are possible, and it is intended therefore, to cover all such modifications and variations as fall within the scope of the invention.

What is claimed is:

1. As an article of manufacture, a leader film for motion picture projection film having parallel, longitudinal lines thereon in the portion of the film intended to be exposed to light, said lines being of different colors and being relatively close so that when the film is in focus two distinct colors are projected and when the film is out of focus a single line of a different color is projected, representing the resultant of the two different colors of the two lines.

2. As an article of manufacture, a leader film for motion picture projection film having a pair of relatively closely spaced longitudinally extending parallel lines thereon of two different complementary colors, whereby when the film is in focus two distinct different colored lines are projected whereas when the film is out of focus a single gray line is projected.

References Cited in the file of this patent

UNITED STATES PATENTS

| | | |
|---|---|---|
| 2,579,581 | Hustad | Dec. 25, 1951 |
| 2,592,291 | Kellogg | Apr. 8, 1952 |

FOREIGN PATENTS

| | | |
|---|---|---|
| 435,506 | Germany | Oct. 16, 1928 |

OTHER REFERENCES

Article, Journal of the Society of Motion Picture Engineers, August 1933, pages 89–94.